Patented May 17, 1949

2,470,486

UNITED STATES PATENT OFFICE 2,470,486

PROCESS OF REGENERATING MAGNESIUM SILICATE ADSORBENTS

Russell J. Hawes, Cranford, N. J., assignor to Tide Water Associated Oil Company, Bayonne, N. J., a corporation of Delaware No Drawing. Application January 14, 1947, Serial No. 722,075

7 Claims. (Cl. 252—412)

The present invention relates to a method for treating adsorbent materials and, more particularly, to the treatment of adsorbents that have decreased in decolorizing activity as a result of having been used for decolorizing of oils. More specifically, the present invention is concerned with the treatment of such adsorbents to increase the decolorizing and/or adsorption capacity thereof.

In the refining of oils, as for example mineral oils of lubricating grade, several methods are commonly employed for removing color-imparting bodies therefrom by use of adsorbents, the most commonly employed methods being the so-called "percolation" and "contact" processes.

In the "percolation" process, a deep static bed of adsorbent material is provided through which the oil is filtered or percolated. When the adsorbent material shows diminished activity by reason of having adsorbed coloring materials from the oil, the oil flow is cut off and the used adsorbent is generally treated with a solvent or by burning at elevated temperatures whereby the used adsorbent is revivified for further use in oil refining.

In the "contact" process, the adsorbent employed is of finely divided form and is added to the body of oil to be refined, e. g., to decolorize the oil. The mixture is agitated at elevated temperatures for a sufficient period of time to obtain the desired degree of refining after which the decolorized oil is separated from the used adsorbent, employing means such as filtration. Generally, the used adsorbent is discarded as its decolorizing efficiency has decreased considerably, although in some cases, the used adsorbent from the contact process may be regenerated and again used for decolorization of oils.

Generally speaking, when employing the heretofore used regenerative processes for used adsorbents, particularly solvent and burning processes for series regeneration, the decolorizing capacity of the adsorbents decrease with repeated use and series regeneration. Although subjecting used adsorbents to such series regeneration may retard their rate of decrease in decolorizing capacity, as far as I am aware, a regenerative step in such series regeneration does not, if at all, substantially increase the decolorizing capacity of the used adsorbent over the corresponding capacity of the same adsorbent at a preceding regenerative step in the series regeneration. The present invention is concerned with a novel method for treating regenerated adsorbents, said adsorbents having been used in decolorization of oils with resulting decrease in decolorizing capacity, to provide adsorbents that have decolorizing capacities in excess of the corresponding capacities of the same adsorbents subjected to the heretofore commonly employed methods of regeneration, such as burning and/or solvent methods.

The adsorbents which are particularly adapted for treatment in accordance with the present invention are silicate type compositions, suitable examples of which are synthetic magnesium silicate adsorbents, including exchange magnesium silicates prepared by cation exchange reaction of a magnesium ion-containing solution and a silicate containing a cation exchangeable with magnesium, as for example, calcium silicate, providing a highly active adsorbent for decolorizing treatment of oils.

In broad aspect, the present invention comprises a process for increasing the decolorizing efficiency of reactivated adsorbents, particularly synthetic magnesium silicate adsorbents, by treating such adsorbents with magnesium ions, as for example, by contacting such adsorbents with a solution containing magnesium ions, e. g., an aqueous solution of magnesium chloride. As discussed hereinbefore, the adsorbents embodied for treatment by the present invention are those that have decreased in adsorption efficiency due to their having been employed for decolorizing of oil and subjected to reactivation. For purposes of simplification, such adsorbents, when referred to herein, are designated as "reactivated adsorbents." By employing the novel treatment provided herein, and more fully described hereinafter, the decolorizing efficiency of such adsorbents may be increased considerably over and above similar adsorbents that are subjected only to heretofore employed regenerative processes.

In order to further describe my invention, the following examples are set forth illustrating certain embodiments thereof. In each of the following examples, decolorizing capacity is expressed as the number of barrels of unfiltered Pennsylvania cylinder stock reduced to an A. S. T. M. color of 8 per ton of adsorbent.

EXAMPLE I

A freshly prepared magnesium silicate adsorbent, having a decolorizing capacity of 35 barrels per ton of adsorbent, was subjected to percolation filtration of unfiltered Pennsylvania cylinder stock and was continued in such filtration through 10 cycles, each cycle comprising percolation of oil through a static bed of adsorbent and burning of the used adsorbent at 1050° F. for 30 to 40 minutes. After completion of 10 such cycles, the reactivated adsorbent was tested for decolorizing capacity and, on the basis of expressing decolorizing capacity as heretofore described, decolorized about 11 barrels of oil per ton of adsorbent. The reactivated adsorbent was then burned clean at 1050° F. and subjected to 3 treatments, each treatment comprising contacting the adsorbent with a 0.05 molar magnesium chloride solution for one hour at 195° F. The treating solution was then decanted from the adsorbent, the adsorbent washed to remove chloride ions, and dried at 275° F. for 48 hours. The thus-treated adsorbent was tested for decolorizing capacity and decolorized about 19.4 barrels of oil per ton of adsorbent. For purposes of comparison and to illustrate the marked increase in decolorizing capacity provided by practicing the present invention, the capacities of the freshly prepared adsorbent, the same adsorbent after 10 cycles as defined hereinbefore, and the same adsorbent after treatment with magnesium ions are set forth hereinafter in tabulated form:

Decolorizing capacity

| | Barrels/ton of adsorbent |
|---|---|
| Freshly prepared adsorbent | 35 |
| After 10 cycles | 11.1 |
| After treatment with magnesium ion-containing solution | 19.4 |

EXAMPLE II

A freshly prepared synthetic magnesium silicate adsorbent having a decolorizing capacity of 42.7 barrels of oil per ton of adsorbent, was subjected to percolation refining of cylinder stock of the same grade as in Example I, and continued in such treatment for 31 cycles, each cycle comprising percolation of oil through a static bed of adsorbent and solvent revivification using a solvent mixture containing acetone, benzol and water, the solvent mixture having the properties of removing from the adsorbent the color-imparting bodies which the adsorbent removed from an oil in decolorizing treatment thereof. After completion of 31 such cycles, the revivified adsorbent was found to have a decolorizing capacity of 27.9 barrels per ton of adsorbent. The adsorbent was then burned clean at 1050° F., and subjected to 3 treatments, each treatment comprising contacting of the adsorbent at 195° F. for 1 hour with a 0.05 molar aqueous magnesium chloride solution. The treating solution was decanted from the adsorbent, the adsorbent washed to remove chloride ions, and dried for 48 hours at 275° F. The treated adsorbent, on being tested for decolorizing capacity, decolorized 37.4 barrels of oil per ton of adsorbent. For purposes of comparison, illustrating the substantial increase in decolorizing capacity provided by practicing the present invention, the capacities of the freshly prepared adsorbent, the same adsorbent after 31 cycles as defined hereinbefore, and the same adsorbent after treatment in accordance with the present invention are set forth in tabulated form hereinafter:

Decolorizing capacity

| | Barrels/ton of adsorbent |
|---|---|
| Freshly prepared adsorbent | 42.7 |
| After 31 cycles | 27.9 |
| After treatment with magnesium chloride solution | 37.4 |

EXAMPLE III

A freshly prepared synthetic magnesium silicate adsorbent, having a decolorizing capacity of 49.5 barrels of oil per ton of adsorbent, was subjected to 27 cycles of percolation treatment of oil and solvent revivification in a manner similar to that set forth in Example II. After completion of 27 cycles, the decolorizing capacity of the reactivated adsorbent was 36.4 barrels of oil per ton of adsorbent. The reactivated adsorbent was then treated 3 times with magnesium chloride solution in the same manner as set forth in the foregoing examples and the thus-treated adsorbent was found to have increased in decolorizing capacity to 40.6 barrels of oil per ton of adsorbent.

EXAMPLE IV

A synthetic magnesium silicate adsorbent, having a decolorizing capacity of 38 barrels of oil per ton of adsorbent, was subjected to 28 cycles of oil filtration and solvent revivification. After completion of the 28 cycles, the reactivated adsorbent had a decolorizing capacity of 26 barrels of oil per ton of adsorbent. The reactivated adsorbent was then treated in a manner similar to that set forth in Example II, except that only one treatment with magnesium chloride solution was employed. The thus-treated adsorbent was found to have increased in decolorizing capacity to 28.5 barrels of oil per ton of adsorbent.

Referring to the foregoing examples, the data set forth in Example I illustrates the substantial increase in decolorizing capacity provided by practicing the present invention with adsorbents that have decreased in adsorbing activity as a result of having been employed in oil decolorization and furthermore, have been subjected to revivification by burning in a manner heretofore employed for adsorbent regeneration. As shown by the example, regeneration of the used adsorbent by burning at 1050° F. for 30 to 40 minutes provided a decolorizing capacity of only 11.1 barrels of oil per ton of adsorbent, as compared to the original capacity of 35 barrels per ton for freshly prepared adsorbent. However, by treating the absorbent, after having been used in 10 cycles as defined hereinbefore, with a magnesium ion-containing solution, the decolorizing capacity was increased from 11.1 to 19.4 barrels. In other words, decolorizing capacity was increased by about 80% over and above the capacity of the adsorbent which was subjected only to regeneration by burning in accordance with heretofore employed methods.

Similarly, the data set forth in Example II illustrates the marked increase in decolorizing capacity provided by practicing the present invention on adsorbents that have decreased in adsorption capacity as a result of having been used in decolorizing of oils and furthermore, have been subjected to solvent revivification in accordance with heretofore employed methods. As shown by Example II, when subjected only to solvent revivification, the used adsorbent, after 31 cycles, had a decolorizing capacity of 27.9 barrels as compared to 42.7 barrels for the freshly prepared adsorbent. However, by treating the used adsorbent in accordance with the present invention, the capacity was increased from 27.9 to 37.4 barrels. In other words, the capacity was increased by about 34% over and above the adsorbent subjected only to solvent revivification. In a similar manner, Examples III and IV also illustrate the substantial increased capacities provided by practicing the present invention, Example IV illustrating that increased decolorization capacities are also provided when only one treatment with magnesium ion-containing solution is employed.

As is illustrated in the foregoing examples, the present invention is adapted for use in treating used adsorbents that have been subjected to regeneration by burning or by solvent means. Although, as in Example I, the use of specific conditions of temperature and time employed for regeneration by burning are set forth, such specific conditions are not to be considered limitative as other conditions for regeneration by burning may be suitably employed. Generally speaking, the conditions for regeneration by burning may be varied over rather wide ranges, depending particularly on the type of adsorbent undergoing treatment. However, for most purposes, when the adsorbent is subjected to regeneration by burning prior to employing the magnesium ion treatment of the present invention, burning temperatures of about 900° to 1300° F., and preferably about 1050° F., have been found to provide highly satisfactory results.

With reference to the use of solvents for series revivification of used adsorbents prior to treatment thereof with magnesium ions, Examples II to IV inclusive show the use of a solvent mixture comprising acetone, benzol and water. Although these examples set forth a specific solvent mixture for such a purpose, the invention is not limited thereto for solvent revivification of adsorbents prior to the magnesium ion treatment, as other suitable solvent mixtures may be employed with equally satisfactory results. Generally speaking, compositions suitable for solvent revivification of used adsorbents are those having the characteristics of displacing from the adsorbent color-imparting bodies adhering thereto as a result of having subjected the adsorbent to decolorization treatment of oils. Such compositions are well-known to those skilled in the art, suitable examples being organic compositions, as for example compositions containing (a) benzol and acetone, (b) benzol, alcohol and acetone, (c) benzol, acetone and water, and the like.

As hereinbefore stated, the present invention embodies a novel treatment for reactivated adsorbents which comprises contacting such adsorbents, particularly synthetic magnesium silicates, with magnesium ions whereby a marked increase in decolorizing capacity is provided. The treatment with magnesium ions is preferably effected by employing a solution containing such ions as for example, an aqueous solution of magnesium chloride. Likewise, the treating solution may contain ions other than magnesium; for example, solutions containing both calcium and magnesium salts such as certain available brines containing both calcium chloride and magnesium chloride may also be employed. The concentration of magnesium ions in the treating solution may be varied over wide limits and yet provide substantial increases in the decolorizing capacities of reactivated adsorbents when treated in accordance with the present invention. However, for most purposes, it is not necessary to use highly concentrated solutions as dilute solutions of magnesium ions provide highly satisfactory results. For example, a 0.05 molar aqueous solution of magnesium chloride has been found to be highly effective as is illustrated by the foregoing examples.

Although the exact nature underlying the reasons for the exceptional high increases in decolorizing capacities of reactivated adsorbents provided by practicing the present invention is not fully known, the occurrence of such a phenomenon is evidenced by the data set forth in the foregoing examples demonstrating the substantial increases in decolorizing capacities to values over and above corresponding capacities obtained by using burning or solvent revivification methods as heretofore employed.

Although the present invention has been described in conjunction with certain preferred embodiments thereof, those skilled in the art will readily recognize that variations and modifications are to be considered within the purview of the specification and the scope of the appended claims.

I claim:

1. A method for improving the adsorbing efficiency of a magnesium silicate adsorbent which has decreased in adsorbing efficiency by having been contacted with an oil for decolorization thereof by adsorption from said oil of color-imparting bodies adsorbable by said adsorbent which comprises removing said color-imparting bodies from said adsorbent to improve the adsorbing efficiency of said adsorbent, and then subjecting said adsorbent to intimate contact with an aqueous solution containing magnesium ions to still further improve the adsorbing efficiency of said adsorbent.

2. A method for improving the adsorbing efficiency of a magnesium silicate adsorbent which has decreased in adsorbing efficiency by having been contacted with a mineral oil fraction for decolorization thereof by adsorption from said mineral oil of color-imparting bodies adsorbable by said adsorbent, said adsorbent being further characterized by having been prepared by cation exchange between magnesium of a magnesium-ion-containing solution and a silicate containing a cation exchangeable with magnesium, which comprises removing said color-imparting bodies from said adsorbent to improve the adsorbing efficiency of said adsorbent, and then intimately contacting said adsorbent with an aqueous solution containing magnesium ions to still further improve the adsorbing efficiency of said adsorbent.

3. A method, as defined in claim 2, wherein the removal of color-imparting bodies from said adsorbent is effected by subjecting the adsorbent to an elevated temperature sufficient to burn off said bodies.

4. A method, as defined in claim 2, wherein the removal of color-imparting bodies from said adsorbent is effected by solvent revivification.

5. A method for improving the adsorbing efficiency of a magnesium silicate adsorbent which has decreased in adsorbing efficiency by having been contacted with a mineral oil fraction for decolorization thereof by adsorption from said mineral oil of color-imparting bodies adsorbable by said adsorbent, which comprises removing said color-imparting bodies from said adsorbent to improve the adsorbing efficiency of said adsorbent, intimately contacting said adsorbent with an aqueous solution of a water-soluble magnesium salt, washing said adsorbent to remove therefrom anions of said magnesium salt adhering to said adsorbent, and subjecting said adsorbent to an elevated temperature sufficient to substantially remove water adhering to said adsorbent.

6. A method, as defined in claim 5, wherein the magnesium salt is magnesium chloride.

7. A method for improving the adsorbing efficiency of a magnesium silicate adsorbent which has decreased in adsorbing efficiency by having been contacted with a liquid for decolorizing thereof by adsorption from said liquid of color-imparting bodies adsorbable by said adsorbent and reactivated by removal of said color-imparting bodies from said adsorbent, which comprises subjecting said reactivated adsorbent to intimate contact with a solution containing magnesium ions to substantially improve the adsorbing efficiency of said reactivated adsorbent.

RUSSELL J. HAWES.

REFERENCES CITED

The following references are of record in the file of this patent:

UNITED STATES PATENTS

| Number | Name | Date |
| --- | --- | --- |
| 1,770,166 | Bent | July 8, 1930 |
| 2,033,374 | Gayer | Mar. 10, 1936 |
| 2,254,618 | McMillan et al. | Sept. 2, 1941 |
| 2,359,343 | Winding | Oct. 3, 1944 |
| 2,359,345 | Winding | Oct. 3, 1944 |
| 2,364,015 | Winding | Nov. 28, 1944 |
| 2,414,736 | Gray | Jan. 21, 1947 |